United States Patent
Bosneaga

(10) Patent No.: US 11,443,474 B2
(45) Date of Patent: Sep. 13, 2022

(54) GENERATION OF TEXTURE MODELS USING A MOVEABLE SCANNER

(71) Applicant: ARTEC EUROPE S.À R.L., Luxembourg (LU)

(72) Inventor: Anton Bosneaga, Berkeley, CA (US)

(73) Assignee: ARTEC EUROPE S.Á R.L., Luxembourg (LU)

(*) Notice: Subject to any disclaimer, the term of this patent is extended or adjusted under 35 U.S.C. 154(b) by 0 days.

(21) Appl. No.: 17/166,923

(22) Filed: Feb. 3, 2021

(65) Prior Publication Data

US 2021/0158600 A1 May 27, 2021

Related U.S. Application Data

(63) Continuation of application No. PCT/IB2020/000009, filed on Jan. 21, 2020.

(60) Provisional application No. 62/840,290, filed on Apr. 29, 2019, provisional application No. 62/801,568, filed on Feb. 5, 2019.

(51) Int. Cl.

| | |
|---|---|
| *G06T 15/04* | (2011.01) |
| *G06T 7/514* | (2017.01) |
| *G06T 7/90* | (2017.01) |
| *G06T 13/20* | (2011.01) |
| *G06T 15/08* | (2011.01) |
| *G06V 20/64* | (2022.01) |
| *G06V 30/142* | (2022.01) |

(52) U.S. Cl.
CPC .............. *G06T 15/04* (2013.01); *G06T 7/514* (2017.01); *G06T 7/90* (2017.01); *G06T 13/20* (2013.01); *G06T 15/08* (2013.01); *G06V 20/64* (2022.01); *G06V 30/142* (2022.01)

(58) Field of Classification Search
None
See application file for complete search history.

(56) References Cited

U.S. PATENT DOCUMENTS

| | | | |
|---|---|---|---|
| 6,639,594 B2 | 10/2003 | Zhang et al. | |
| 7,616,198 B2* | 11/2009 | Herken | G06T 7/507 345/426 |
| 2016/0042530 A1 | 2/2016 | Imber et al. | |
| 2017/0103280 A1* | 4/2017 | Kusumi | G06T 7/11 |

(Continued)

OTHER PUBLICATIONS

Artec Europe S.A.R.L., International Search Report and Written Opinion, PCT/IB2020/000009, dated May 12, 2020, 13 pgs.

(Continued)

*Primary Examiner* — Nurun Flora
(74) *Attorney, Agent, or Firm* — Morgan, Lewis & Bockius LLP

(57) ABSTRACT

A method is performed at a moveable scanner with one or more optical sensors. The method includes scanning, using the moveable scanner, an object having a surface. The scanning generates color data from a plurality of orientations of the moveable scanner with respect to the object. The method further includes generating, using at least the color data, a pixel map of the surface of the object, the pixel map including, for each respective pixel of a plurality of pixels: a color value of a corresponding point on the surface of the object; and a value for a non-color property of the corresponding point on the surface of the object.

26 Claims, 13 Drawing Sheets

(56) References Cited

U.S. PATENT DOCUMENTS

2018/0047208 A1* 2/2018 Marin .................. G06T 7/521

OTHER PUBLICATIONS

Artec Europe S.A.R.L., International Preliminary Report on Patentability, PCT/IB2020/000009, dated Aug. 10, 2021, 9 pgs.
Cook, A Reflectance Model for Computer Graphics, ACM Transactions on Graphics, vol. 1, No. 1, Jan. 1982, pp. 7-24, 18 pgs.
Felipe Hernandez-Rodriguez et al., "Extended Photometric Sampling for Surface Shape Recovery," Jun. 27, 2012, International Conference on Financial Cryptography and Data Security, [Lecture Notes in Computer Science; Lect.Notes Computer], Springer, Berlin, Heidelberg, pp. 55-64, XP047009378, ISBN: 978-3-642-17318-9.
Fyffe, Near-Instant Capture of High-Resolution Facial Geometry and Reflectance, SIGGRAPH 2015 Talks, Aug. 9-13, 2015, Los Angeles, CA, 1 pg.
Karis, Real Shading in Unreal Engine 4, Epic Games, 2013, 49 pgs.
Schlik, An Inexpensive BRDF Model for Physically-based Rendering, LaBRI, Talence, France, 1994, 15 pgs.
Tetzlaff, Using Flash Photography and Image-Based Rendering to Document Cultural Heritage Artifcats, Eurographics Workshop on Graphics and Cultural Heritage, Eurographics Proceedings, 2016, The Eurographics Association, DOI: 10.2312/gch.20161397, 10 pgs.

* cited by examiner

Generate, using at least the color data, a pixel map of the surface of the object, the pixel map including, for each respective pixel of a plurality of pixels: ~720 a color value of a corresponding point on the surface of the object; and a value for a non-color property of the corresponding point on the surface of the object (B)

---

The non-color property is a normal direction.

For each respective pixel of the plurality of pixels of the pixel map, the color value is determined using color data from a predefined range of angles relative to the normal direction for the respective pixel. ~732

> The predefined range of angles is a range of angles greater than a diffuse threshold angle.
>
> For each respective pixel of the plurality of pixels of the pixel map, a specular parameter is determined using color data obtained at angles relative to the normal direction that are less than the diffuse angle threshold. ~734

> For each respective pixel of the plurality of pixels of the pixel map, the normal direction is determined by selecting, as the normal direction, the angle at which a maximum luminance occurs in the color data. ~736

> For each respective pixel of the plurality of pixels of the pixel map, the normal direction is determined by fitting the color data to a predetermined function of the angle at which the color data was obtained and selecting, as the normal direction, the angle at which the fitted predetermined function has a maximum luminance ~738

Generate, using at least the color data, a pixel map of the surface of the object, the pixel map including, for each respective pixel of a plurality of pixels:
    a color value of a corresponding point on the surface of the object; and
    a value for a non-color property of the corresponding point on the surface of the object ~720

(C)

For each pixel of the plurality of pixels of the pixel map, the value for the non-color property of the corresponding point on the surface of the object is determined by:

providing, to a solver for a set of one or more physically-based rendering (PBR) equations, the images of the surface of the object together with information indicating the orientations of the 3D scanner with respect to the object at which the images were obtained; and receiving, as an output from the solver for the set of one or more physically-based rendering (PBR) equations, the value for the non-color property of the corresponding point on the surface of the object. ~740

Generate, using the 3D reconstruction of the at least portion of the shape of the surface of the object and pixel map, a textured 3D representation of the object ~742

Use the textured 3D representation of the object to animate a corresponding object in an animation ~744

FIG. 7D

GENERATION OF TEXTURE MODELS USING A MOVEABLE SCANNER

RELATED AND PRIORITY APPLICATIONS

This application is a continuation-in-part of PCT App. PCT/IB2020/000009, filed Jan. 21, 2020, which claims priority to U.S. Prov. App. No. 62/840,290, filed Apr. 29, 2019, and U.S. Prov. App. No. 62/801,568, filed Feb. 5, 2019, each of which is incorporated by reference herein in its entirety.

TECHNICAL FIELD

The present invention relates generally to generating texture models and, more particularly, to generate texture models using moveable scanners, such as structured light three-dimensional scanners and/or photogrammetry scanners.

BACKGROUND

A goal of computer graphics is to accurately model the physical appearance of objects, including their color, under different lighting conditions. To do so, it is necessary to have a texture model for an object. Generating a physically accurate texture model is more complicated than simply taking photographs of the object to observe their color. For example, when a person takes a photograph of an object, the photograph shows only what the object looks like under the particular lighting conditions that were present when the photograph was taken. In addition, certain lighting conditions, such as a flash, can leave stray highlights in the photograph (e.g., areas of the object that appear overly bright and shiny).

Thus, if a 3D model of the object were textured from such photographs (e.g., if a texture model were generated using such photographs), without any additional processing, the 3D model would not appear physically accurate. The challenge in generating physically accurate texture models is to produce a model of the physical characteristics that affect the appearance of the object, rather than, e.g., the characteristics present in a single photograph. Such a model is particularly useful for animations so that the texture of the object can be accurately shown from different angles and in a variety of lighting conditions.

SUMMARY

In accordance with some embodiments, a method of generating a texture model for an object is provided. The method includes scanning an object having a surface. The scanning generates color data from a plurality of orientations of the 3D scanner with respect to the object. The method further includes generating, using at least the color data, a pixel map of the surface of the object, the pixel map including, for each respective pixel of a plurality of pixels: a color value of a corresponding point on the surface of the object; and a value for a non-color property of the corresponding point on the surface of the object.

In accordance with some embodiments, an electronic system for generating texture models of objects is provided. The electronic system includes a scanner (e.g., a moveable scanner, such as a moveable 3D scanner) that includes one or more optical sensors, one or more processors, and memory. The memory stores instructions that, when executed by the one or more processors, cause the one or more processors to perform any of the methods described herein.

In accordance with some embodiments, a non-transitory computer readable storage medium is provided. The non-transitory computer readable storage medium stores instructions that, when executed by an electronic system with one or more processors, memory and a moveable scanner that includes one or more optical sensors, cause the one or more processors to perform any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7D illustrate a flow diagram of a method of generating a texture model for an object, in accordance with some embodiments.

DESCRIPTION OF EMBODIMENTS

Figure 1A:
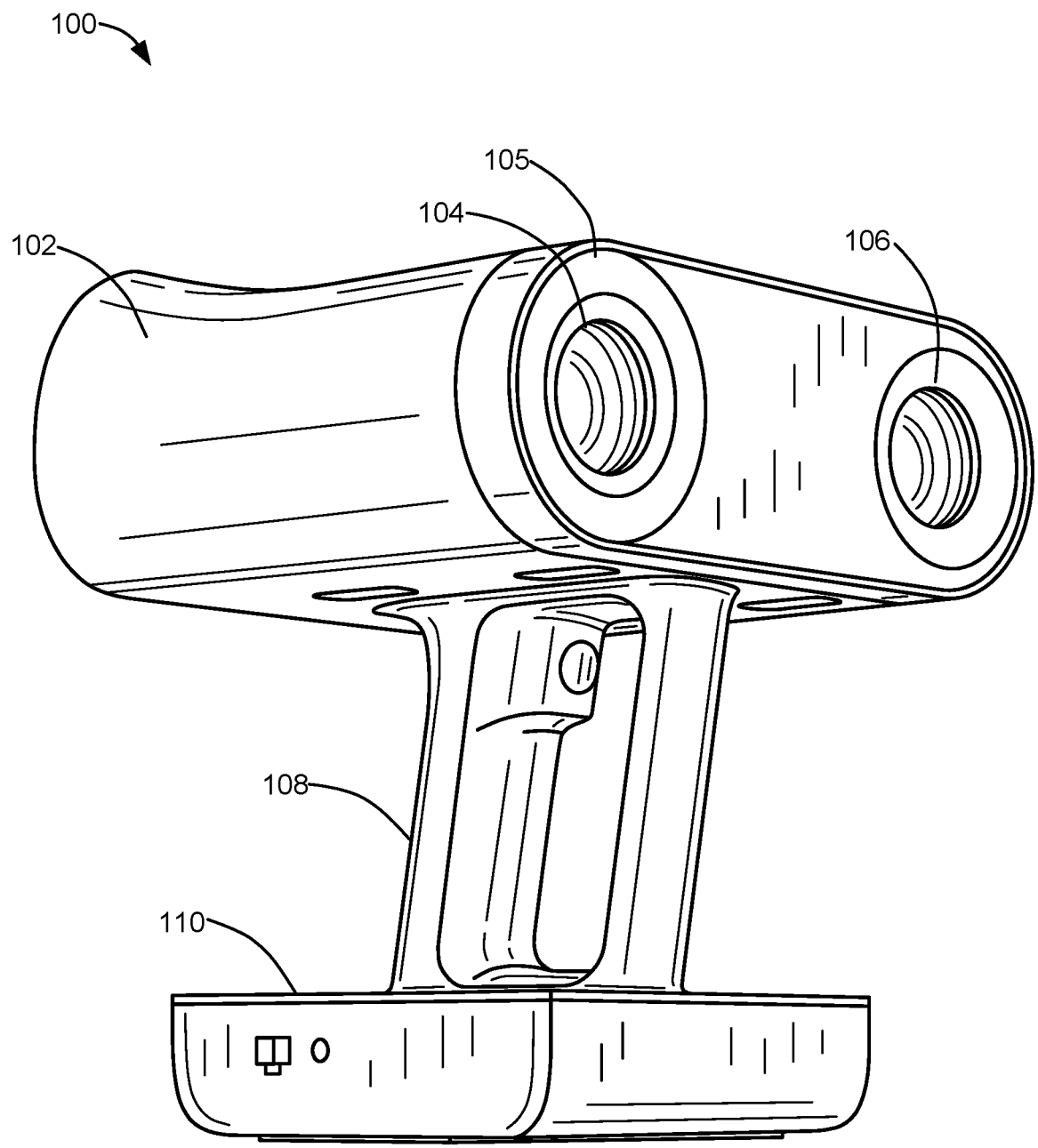
FIGS. 1A-1B illustrate various views of a 3D scanner, in accordance with some embodiments.

The disclosed embodiments use color data obtained by a moveable scanner to generate realistic texture maps of objects. In some embodiments, the moveable scanners are three-dimensional (3D) scanners (e.g., devices that build a 3D model of the surface of the object). These 3D scanners are used to generate realistic textured 3D representations of physical objects. Some 3D scanners are based on a structured light approach, described below, while others are based on a photogrammetry approach. Three-dimensional scanners have applications across many fields, including industrial design and manufacturing, computerized animation, science, education, medicine, art, design, and others.

With conventional 3D scanners, the only type of per-pixel material information made available to the user is a color map assembled with inconsistent illumination. With such scanners, a red, green, blue (RGB) value is generated for each pixel based on the observed values of a given area of the surface of the object. For example, the different color values for each pixel are averaged or one of the color values is chosen as representative (e.g., the brightest pixel). Stated another way, the textures generated by these scanners are assembled without regard to the behavior of the reflected light as well as the direction and intensity at which each pixel of color texture was captured. The resulting color maps contain inconsistent lighting and shading information and do not contain material information which would aid in the photorealistic rendering of the object.

Alternatively, conventional systems that are specifically designed to generate photorealistic texture models of materials generally require complex systems of precisely positioned and carefully calibrated lights and cameras.

The present disclosure provides systems and methods that separate inconsistent illumination and shading from the true surface color of an object using a moveable scanner (e.g., a 3D scanner), without the need for complex systems of precisely positioned and carefully calibrated lights and cameras. In addition, the systems and methods provided herein allow material properties (reflectivity, specular color, metalness, surface roughness) to be measured for each pixel of a texture map for the object. This is done by using corresponding pixels from different images of an object's surface (e.g., captured at different orientations as a scanner is moved with respect to the object) together with tracking data that provides information about the orientations at which the different values were captured. Stated another way, in some embodiments, the 3D scanner collects color values (e.g., RGB values) for various pixels and records the angles at which those values are captured. The color values from the corresponding pixels are related to material properties using equations that describe the behavior of light incident at various angles on a surface of an object (e.g., a Lambertian diffuse model or a more complex texture model). This process yields a single, corrected, RGB value for each pixel point, thus removing stray highlights. Further, properties such as a maximum specular value and the angle at which this value occurs may be computed.

In some embodiments, rather than requiring precisely positioned and carefully calibrated lights and cameras, the position of camera(s) (which is/are a component of the scanner) relative to the object being scanned can be inferred from the 3D data acquired by the 3D scanner. Further, in some embodiments, the 3D scanners described herein include their own light sources, which are fixed with respect to the camera(s). Thus, in some circumstances, the position of the light sources relative to the object is also known or can be inferred from the 3D data and/or tracking data. In some circumstances (e.g., especially when the scanning is performed in ambient darkness), the light source(s) from the 3D scanner provide the dominant light in the texture and/or 3D images. In some embodiments (e.g., those that use a BRDF model), an assumption that the dominate light is directed from a position that is fixed and known with respect to the 3D scanner greatly simplifies the computational task of calculating the texture model from the 3D data and color data.

For example, some embodiments use a structured light approach, in which the 3D scanner obtains the 3D data in part by repeatedly (e.g., stroboscopically) projecting a spatial pattern of light onto the surface of the object, and, while the spatial pattern of light is projected onto the surface of the object, acquiring images of the surface of the object. In some embodiments, the images from the 3D data are used to determine material (e.g., specularness) and or texture (e.g., color) properties of the object, using an assumption that the light is incident upon the object from the direction of the 3D scanner. The material properties can then be used to correct color images. In various embodiments, the color images are the same images that comprise the 3D data or different images (e.g., the 3D data comprises images obtained by a grayscale camera whereas the color data comprises images obtained by an RGB camera).

In some embodiments, the texture images are acquired while the pattern of light is not shone onto the surface of the object. To that end, in some embodiments, the 3D scanners described herein include a separate light source (e.g., flash) that operates stroboscopically in between projections of the spatial pattern of light. The texture images are acquired while the light from the separate light source is shone onto the object. In some embodiments, the material properties of the object are determined from the texture images, and are used to correct the texture. In some embodiments, as noted above, the material properties are determined from the images comprising the 3D data, and are used to correct the texture. These systems and methods allow for considerable improvements in texture models generated by 3D scanning. In addition, these systems and methods aid in the detection of various material properties.

Reference will now be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these specific details. In other instances, methods, procedures, components, circuits, and networks well-known to those of ordinary skill in the art are not described in detail so as not to unnecessarily obscure inventive aspects of the embodiments.

Figure 1B:
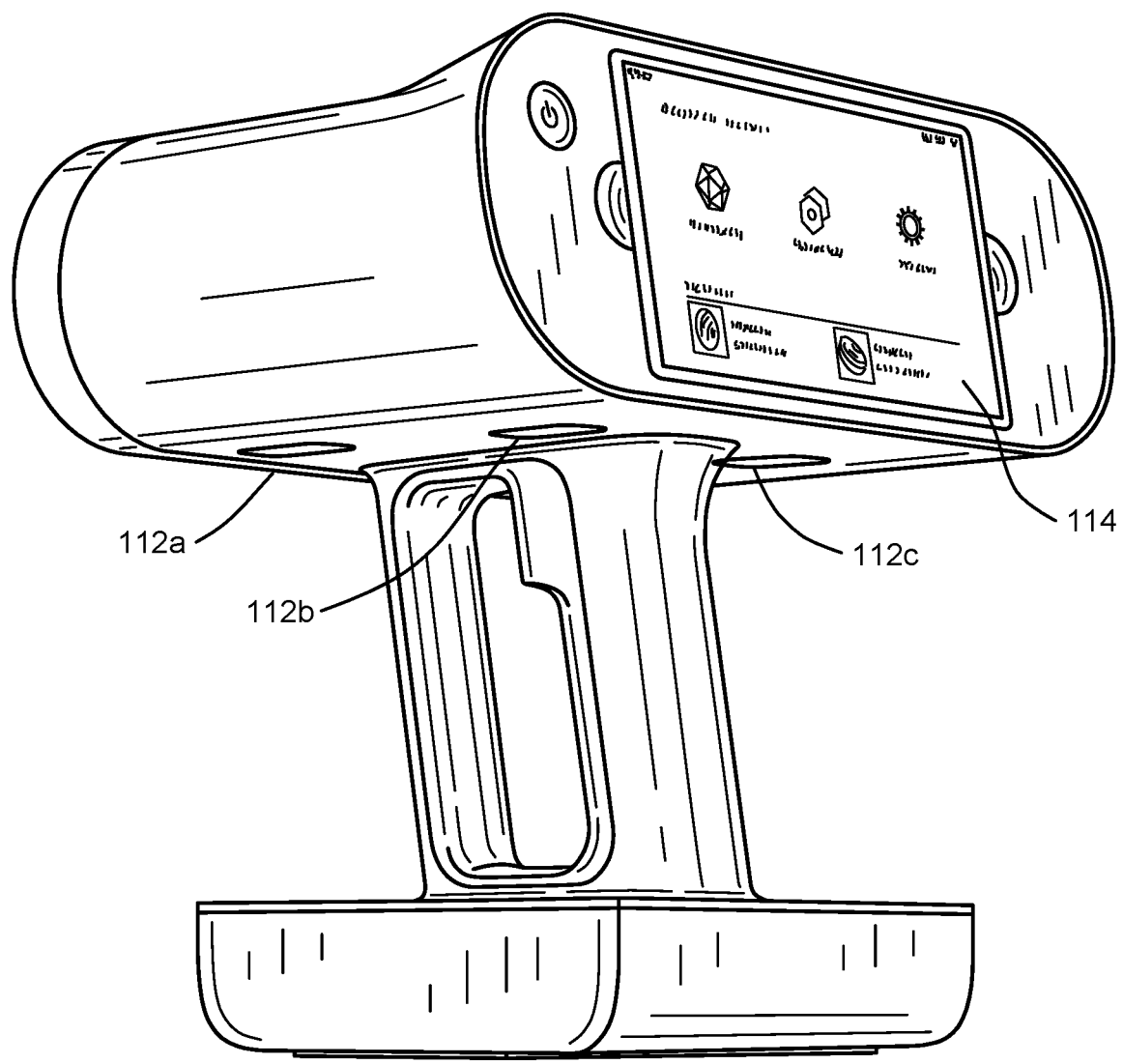

FIGS. 1A-1B illustrate front and back views of a 3D scanner 100, in accordance with some embodiments. In some embodiments, 3D scanner 100 is used to acquire data from which realistic color maps of objects can be generated. It should be understood, however, that 3D scanner 100 is only an example of such a device. Other devices (such as photogrammetry scanners) can also be used to generate realistic color maps of objects, in accordance with the embodiments of the present disclosure.

Scanner 100 includes a main body housing 102, a handle 108, and a battery housing 110 (e.g., which contains a battery). In some embodiments, 3D scanner 100 is a portable, handheld scanner. To that end, in some embodiments, 3D scanner 100 has dimensions less than 30 cm×30 cm×30 cm (e.g., fits inside a box with dimensions 30 cm×30 cm×30 cm). In some embodiments, 3D scanner 100 is sufficiently light to be carried by a person with one hand (e.g., 3D scanner 100 weighs about 2.5 kg).

In some embodiments, the main body housing 102 can be separated from the handle 108. In some embodiments, the main body housing 102 can be mounted (e.g., without the handle 108 and battery housing 110) to a separate apparatus (e.g., a robotic motorized scanning arm) via mounting points 112 (e.g., mounting point 112a through mounting point 112c). Thus, 3D scanner 100 can be converted from a handheld scanner to an industrial or laboratory scanner.

In some embodiments, 3D scanner 100 generates a 3D model of an object by projecting a spatial pattern of light (referred to herein as "structured light") onto the surface of the object, and, while the spatial pattern of light is projected onto the surface of the object, acquiring, using an optical sensor (e.g., a camera), an image of the surface of the object. To that end, the main body housing 102 houses one or more internal light sources (e.g., VCSEL laser 606, FIG. 6) and source optics 104. The one or more internal light sources project light stroboscopically (e.g., project pulsed light), at a particular frequency, through a spatially-patterned slide internal to the main body housing 102 (e.g., slide 616, FIG. 6), through source optics 104, onto the surface of the object.

Images of the structured light projected onto the surface of the object are acquired through camera optics 106 housed by the main body housing 102. One or more cameras/sensors (e.g., CCD detectors 602, FIG. 6) record the images of the structured light projected onto the surface of the object. A 3D model of the shape of the surface of the object can be determined by distortions in the pattern of the light projected onto the surface of the object (i.e., where the distortions are caused by the shape of the surface of the object), as described in greater detail in U.S. Pat. No. 7,768,656, entitled "System and Method for Three-Dimensional Measurement of the Shape of Material Objects," which is hereby incorporated by reference in its entirety. In some embodiments, the internal light sources are lasers. In some embodiments, the internal light sources are vertical-cavity surface-emitting lasers (VCSELs). In some embodiments, 3D scanner 100 operates as a class-1 light source, meaning that the lasers are considered class-1 everywhere outside of the main body housing 102 (i.e., as defined by 21 Code of Federal Regulations (CFR) Part 1040 as of the filing date of this disclosure).

In addition, in some embodiments, the 3D scanner 100 includes one or more additional light sources 105 (e.g., flashes). For example, in some embodiments, the one or more additional light sources 105 comprise a ring of LEDs surrounding the source optics 104. In some embodiments, the one or more additional light sources 105 emit light stroboscopically (e.g., out of phase and/or out of sync with the one or more internal light sources of the source optics 104, such that when the light from the additional light sources 105 is shone onto the object, the stroboscopic light from the source optics 104 is not shone onto the object, and vice versa). In some embodiments, the additional light sources 105 emit visible light (e.g., that is directed to second camera 602b, as described with reference to FIG. 6).

Note that, in some embodiments, 3D scanner 100 provides sufficient illumination of the surface of the object so that images acquired in outdoor daylight conditions have a signal-to-noise ratio sufficient to reconstruct the 3D shape of at least the portion of the object (e.g., with an accuracy of at least 0.1 mm, 0.2 mm, 0.3 mm, 0.4 mm, or 0.5 mm; or, alternatively, with a resolution of 0.25 mm, 0.5 mm, 0.75 mm, or 1 mm). The normal approach for assuring that lasers operate in the class-1 range is to enclose the laser in a large housing, such that by the time the light exits the housing, the light is attenuated enough to be considered class-1. This approach does not work for handheld scanners, since handheld scanners must have a relatively small size (e.g., less than 30 cm×30 cm×30 cm). Some embodiments of the present disclosure operate the light sources enclosed in the main body housing 102 as class-1 light sources through a suitable choice of pulse width, peak power, repetition rate, and/or duty cycle, allowing scanner 100 to be handheld, safe, and operable in normal daylight conditions (e.g., at 120,000 lux, 100,000 lux, 20,000 lux, 2,000 lux, or 1,000 lux). This also allows scanner 100 to have a relatively short minimum working distance (e.g., a minimum working distance that is no greater than 35 mm).

In addition, to increase the signal to noise from the structured light data, and to differentiate structured light data from texture (e.g., color) data, in some embodiments, the VCSEL lasers described above are operated at a frequency outside of the visible spectrum (e.g., an infrared (IR) frequency). In such embodiments, the main body housing 102 encloses, in addition to a camera lens (e.g., camera optics 106), an IR/visible beam splitter, which directs IR light to a first optical sensor (e.g., CCD detector 602-a, FIG. 6) and visible light to a second optical sensor (e.g., CCD detector 602-b, FIG. 6). In some embodiments, data from the first optical sensor is detected synchronously with the stroboscopic light from the one or more internal light sources so that data at the stroboscopic frequency is detected preferentially to information at other frequencies. This can be done, for example, using synchronous demodulation or by gating the first optical sensor to collect data synchronously with the one or more light sources producing light.

In some embodiments, the second optical sensor enclosed in main body housing 102 (e.g., CCD detector 602-b, FIG. 6) acquires texture data (e.g., color data). In some embodiments, the texture data (e.g., images) is used both to render the 3D reconstruction in color as well as to track the position and/or rotation of the scanner 100 (e.g., through photogrammetry analysis), which is in turn used to register (e.g., align) the structured light data (e.g., the 3D shape data) taken by the 3D scanner 100 at different positions with respect to the object (e.g., as described below with reference to FIG. 3).

In some embodiments, the main body housing 102 also encloses one or more movement sensors that track movement of the scanner 100. The one or more movement sensors optionally include a 3-axis accelerometer, 3-axis gyroscope, and/or 3-axis magnetometer to measure position and/or rotation of the scanner 100. In some embodiments, the one or more movement sensors include all three of a 3-axis accelerometer, a 3-axis gyroscope, and a 3-axis magnetometer, and is thus referred to as a nine (9) degree of freedom (DOF) sensor, despite the fact that scanner 100 has only six mechanical degrees of freedom (i.e., three positional, and three rotational degrees of freedom). The position and/or rotation data from the one or more movement sensors is used to track the position and/or rotation of the scanner 100 (e.g., through application of a Kalman filter), which is in turn used to register (e.g., align) the structured light data (e.g., the 3D shape data) and the color data (e.g., images) taken by the scanner 100 at different positions with respect to the object (e.g., as described below with reference to FIG. 3).

To facilitate onboard automatic processing (e.g., to produce at least an initial 3D reconstruction of an object), in order to give users a fully mobile scanning experience, in some embodiments, the main body housing 102 houses a plurality of processors, including one or more field-programmable gate arrays, one or more graphical processing units (GPUs), and/or one or more CPUs. In some embodiments, the main body housing 102 contains sufficient processing to generate at least an initial reconstruction of the 3D model of the object (e.g., a preview of the 3D model of the object).

In some embodiments, the main body housing 102 further houses a display 114 that displays a graphical user interface for scanner 100. Among other things, as scanner 100 scans an object, the graphical user interface for scanner 100 displays an initial 3D reconstruction of the object (e.g., a preview of the 3D reconstruction of the object). In some embodiments, the display 114 is a touch-sensitive display (sometimes called a touch-screen) and thus can also receive user inputs (e.g., to begin a scan, pause a scan, end a scan, and otherwise control scanner 100).

Figure 2:
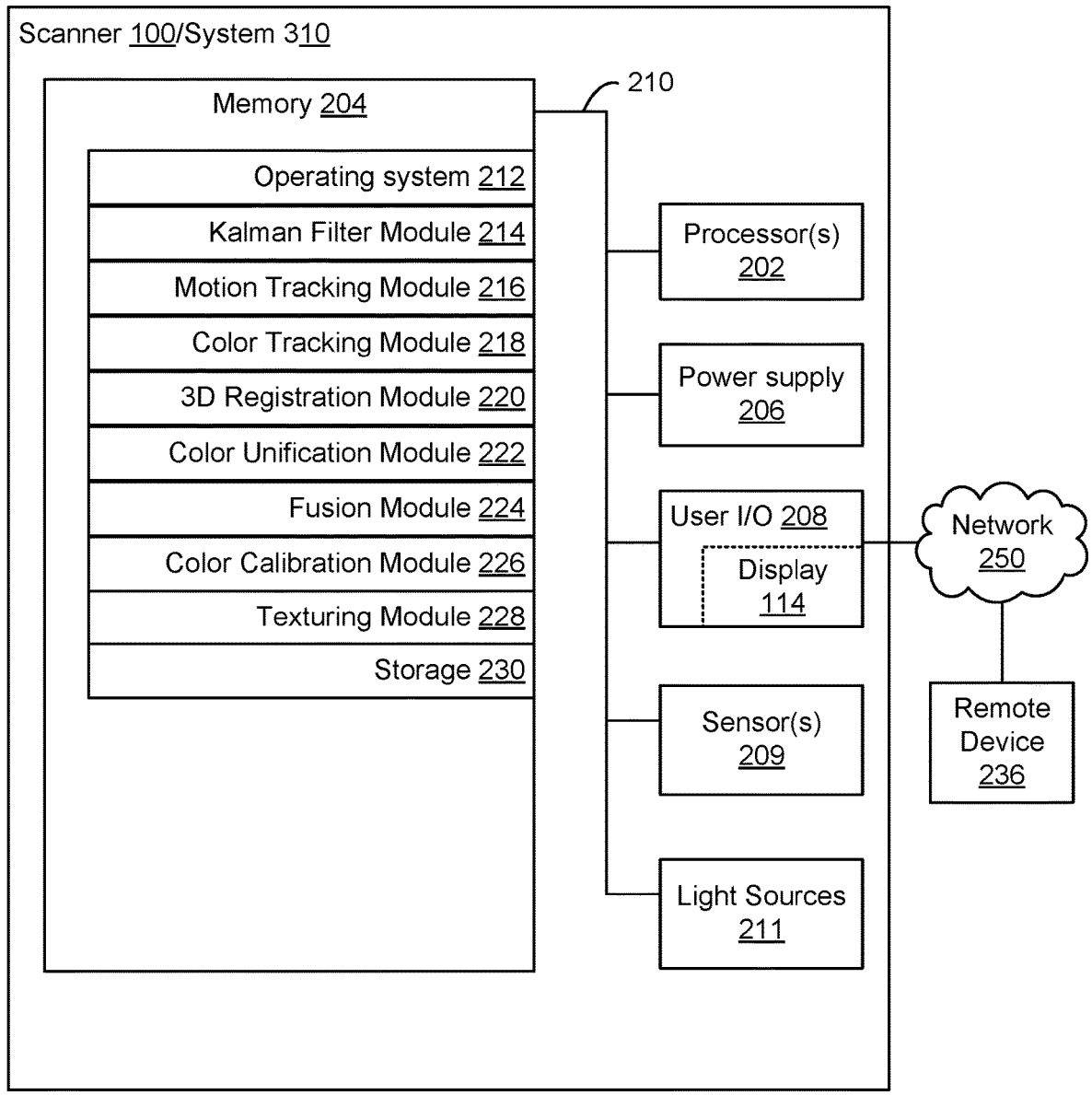
FIG. 2 is a block diagram of a 3D scanner, in accordance with some embodiments.

FIG. 2 is a block diagram of 3D scanner 100 and/or an 3D data processing computer system 310 that received data from a 3D scanner 100 and performs post-acquisition processing, in accordance with some embodiments (collectively, scanner 100 and system 310 are referred to as "system 100/310"). Note that, in some embodiments, the various modules described in FIG. 2 are divided between a 3D scanner and a 3D data processing computer system 310.

System 100/310 typically includes a memory 204, one or more processor(s) 202, a power supply 206, user input/output (I/O) subsystem 208, sensors 209, light sources 211, and a communication bus 210 for interconnecting these components. The processor(s) 202 execute modules, programs, and/or instructions stored in memory 204 and thereby perform processing operations.

In some embodiments, the processor(s) 202 include at least one graphical processing unit. In some embodiments, the processor(s) 202 include at least one field programmable gate array.

In some embodiments, memory 204 stores one or more programs (e.g., sets of instructions) and/or data structures. In some embodiments, memory 204, or the non-transitory computer readable storage medium of memory 204 stores the following programs, modules, and data structures, or a subset or superset thereof:
- an operating system 212;
- a Kalman filter module 214;
- a motion tracking module 216;
- a color tracking module 218;
- 3D registration module 220;
- a color unification module 222;
- a fusion module 224;
- a color-calibration module 226;
- a texturing module 228; and
- storage 230 including buffer(s), RAM, ROM, and/or other memory that stores data used and generated by system 100/310.

The above-identified modules (e.g., data structures and/or programs including sets of instructions) need not be implemented as separate software programs, procedures, or modules, and thus various subsets of these modules may be combined or otherwise re-arranged in various embodiments. In some embodiments, the memory 204 stores a subset of the modules identified above. Furthermore, the memory 204 may store additional modules not described above. In some embodiments, the modules stored in the memory 204, or a non-transitory computer readable storage medium of the memory 204, provide instructions for implementing respective operations in the methods described below. In some embodiments, some or all of these modules may be implemented with specialized hardware circuits (e.g., FPGAs) that subsume part or all of the module functionality. One or more of the above identified elements may be executed by one or more of the processor(s) 202.

In some embodiments, the I/O subsystem 208 communicatively couples the system 100/310 to one or more devices, such as one or more remote device(s) 236 (e.g., an external display) via a communications network 250 and/or via a wired and/or wireless connection. In some embodiments, the communications network 250 is the Internet. In some embodiments, the I/O subsystem 208 communicatively couples the system 100/310 to one or more integrated or peripheral devices, such as display 114.

In some embodiments, sensors 209 include a first optical sensor that collects 3D data (e.g., a first CCD detector, such as CCD detector 602-a, FIG. 6), a second optical sensor that collects texture (e.g., color) data (e.g., a second CCD detector, such as CCD detector 602-b, FIG. 6), and a motion sensor (e.g., a 9 DOF sensor, which may be implemented using microelectromechanical systems (MEMS), gyroscopes, and one or more Hall sensors).

In some embodiments, light sources 211 include one or more lasers. In some embodiments, the one or more lasers comprise vertical-cavity surface-emitting lasers (VCSELs).

In some embodiments, light sources 211 also include an array of light emitting diodes (LEDs) that produce visible light.

The communication bus 210 optionally includes circuitry (sometimes called a chipset) that interconnects and controls communications between system components.

Figure 3:
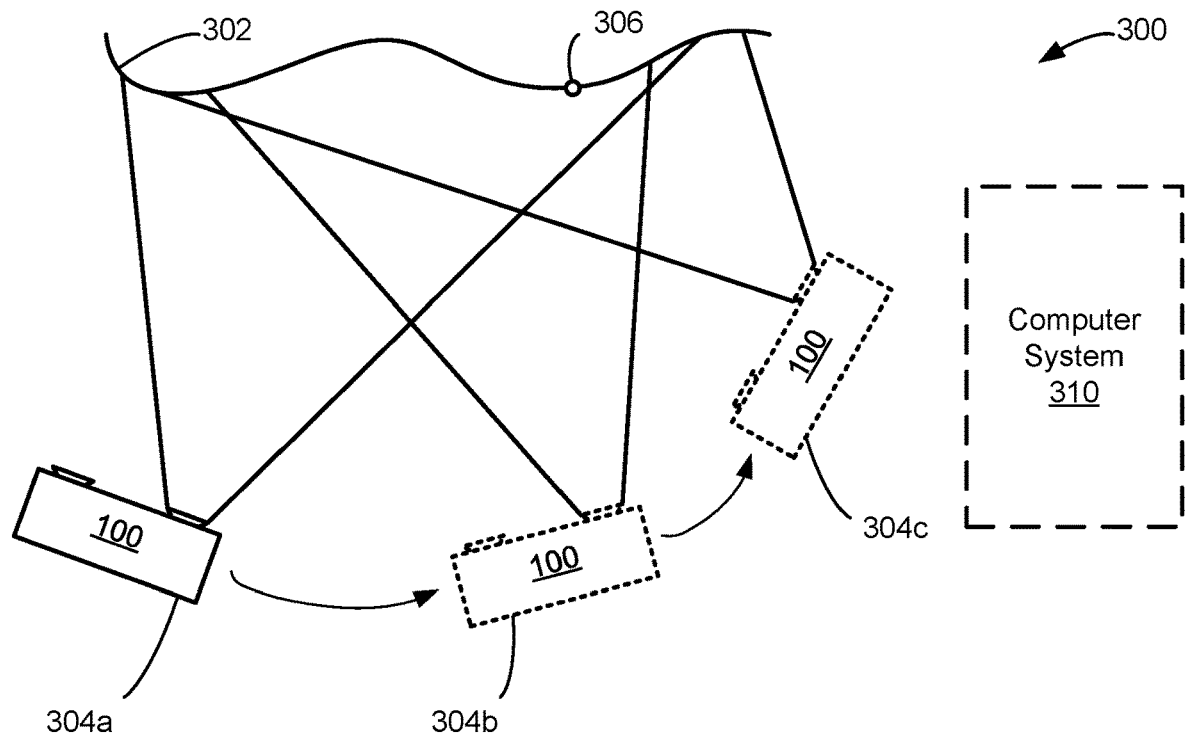
FIG. 3 is a schematic diagram of a data acquisition environment, in accordance with some embodiments.

FIG. 3 is a schematic diagram of a data acquisition environment 300, in accordance with some embodiments. In the data acquisition environment 300, 3D scanner 100 scans an object 302 having a surface. The scanning generates color data (e.g., color images of the surface of the object) from a plurality of orientations (e.g., from positions 304) of the 3D scanner 100 with respect to the object 302. For example, in FIG. 3, 3D scanner is repositioned from position 304a (where it acquires a first color image), to position 304b (where it acquires a second color image), to position 304c (where it acquires a third color images). Note that, in some embodiments, concurrently with acquiring the color data (e.g., color image), 3D scanner 100 acquires data corresponding to a three-dimensional (3D) shape (e.g., by projecting a spatial pattern of light onto the surface of the object and, while the spatial pattern of light is projected onto the surface of the object, acquiring images of surface of the object (e.g., different from the color images)).

Note that each of the first color image (acquired with 3D scanner 100 at position 304a), the second color image (acquired with the 3D scanner 100 at position 304b), and the third color image (acquired with the 3D scanner 100 at position 304c) capture point 306 on the surface of object 302. That is, there is a corresponding pixel in each of the first, second, and third color images that corresponds to the point 306 on the surface of the object 302. In some embodiments, the corresponding pixel in each of the first, second, and third color images has an RGB value, from which a luminance can be calculated as a linear combination of the red (R) value, green (G) value, and the blue (B) value (e.g., a luminosity function). Such a luminance value is sometimes referred to as a "relative luminance" and has a value normalized to 1 or 100. Note that, in some embodiments, luminence data may be obtained from the structured light (3D images) rather than the color image, in an analogous fashion. In this case, images in which the corresponding pixel is too dark are ignored for the purposes of determining luminence of the pixel.

In some embodiments, data acquired by the 3D scanner 100 is transmitted (e.g., over a wired or wireless connection) to a 3D data processing computer system 310, where it is received. In some embodiments, the 3D data processing computer system 310 generates a pixel map (e.g., a texture map) of the surface of the object. Alternatively, in some embodiments, the pixel map is generated by the 3D scanner 100.

Figure 4:
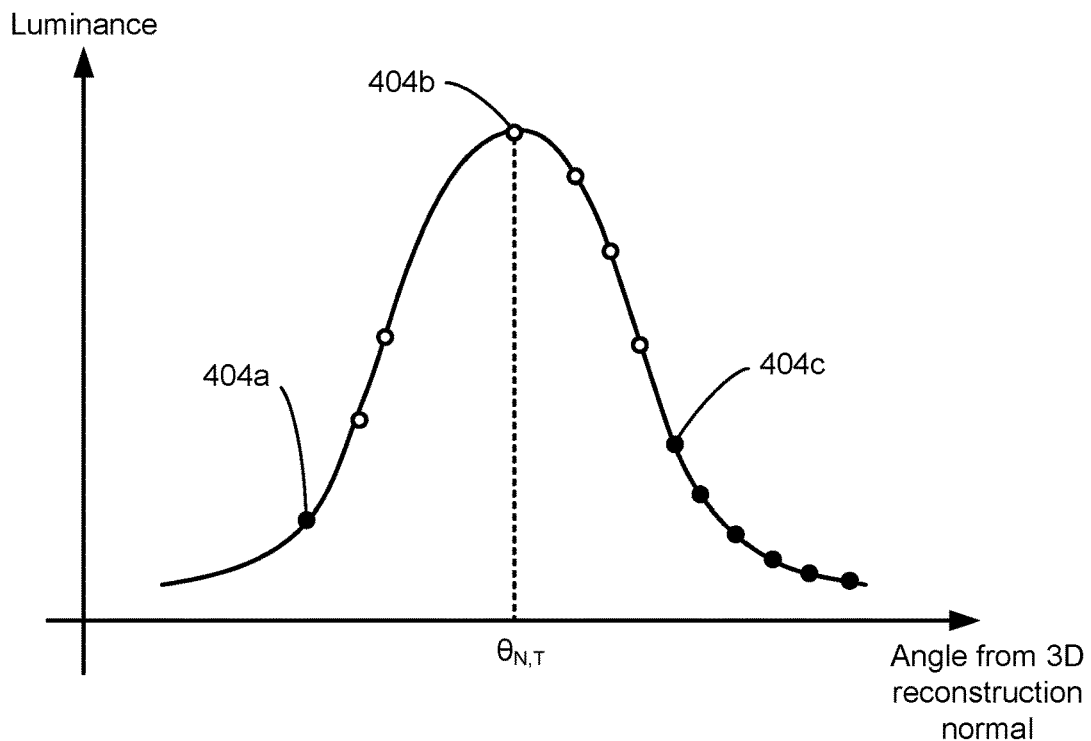
FIG. 4 is a prophetic example of data collected from the data acquisition environment shown in FIG. 3, in accordance with some embodiments.

FIG. 4 is a prophetic example of data collected from the data acquisition environment 300 shown in FIG. 3, in accordance with some embodiments. In particular, FIG. 4 illustrates data collected from point 306 on the surface of object 302. The graph in FIG. 4 illustrates the luminance of various data pixels from different color images (and/or 3D images) acquired at different orientations with respect to the surface of the object. To that end, in some embodiments, 3D scanner 100 and/or 3D data processing computer system 310 determines a pixel-level correspondence between pixels in different images of the surface of the object (e.g., in the provided example, registers the first, second and third color images). In some embodiments, determining a pixel-level correspondence between pixels in different images of the surface of the object includes determining that a first pixel in the first color image corresponds to the same position on the surface of the object as a second pixel in the second color image.

The luminance values are plotted against an angle from a nominal normal vector for the point 306 on the surface of the object. In some embodiments, the nominal normal vector is a normal vector from a 3D reconstruction of the object (e.g., reconstructed from the data corresponding to a three-dimensional (3D) shape acquired during the scan).

The data include the first pixel from the first color image having a luminance 404*a*, the second pixel from the second color image having a luminance 404*b*, and a third pixel from the third color image having a luminance 404*c*. In some embodiments, from these data, a "true normal" direction $\theta_{N,T}$ is determined (e.g., by selecting the angle at which the data pixel with the maximum luminance was acquired, or by fitting the data to a predetermined function (e.g., a Gaussian function) and selecting the angle at which the fitted predetermined function has a maximum, as described in greater detail with reference to method 700 in FIGS. 7A-7C). In some embodiments, using the "true normal" direction, a diffuse value is determined (e.g., by using data pixels acquired at angles that exceed a predefined angle relative to the true normal direction—these data are shown in FIG. 4 as solid dots, whereas angles within the predefined angle are shown in open dots). Other material properties, such as a specularness, a metalness parameter, a surface roughness may be determined using the true normal direction.

Figure 5A:
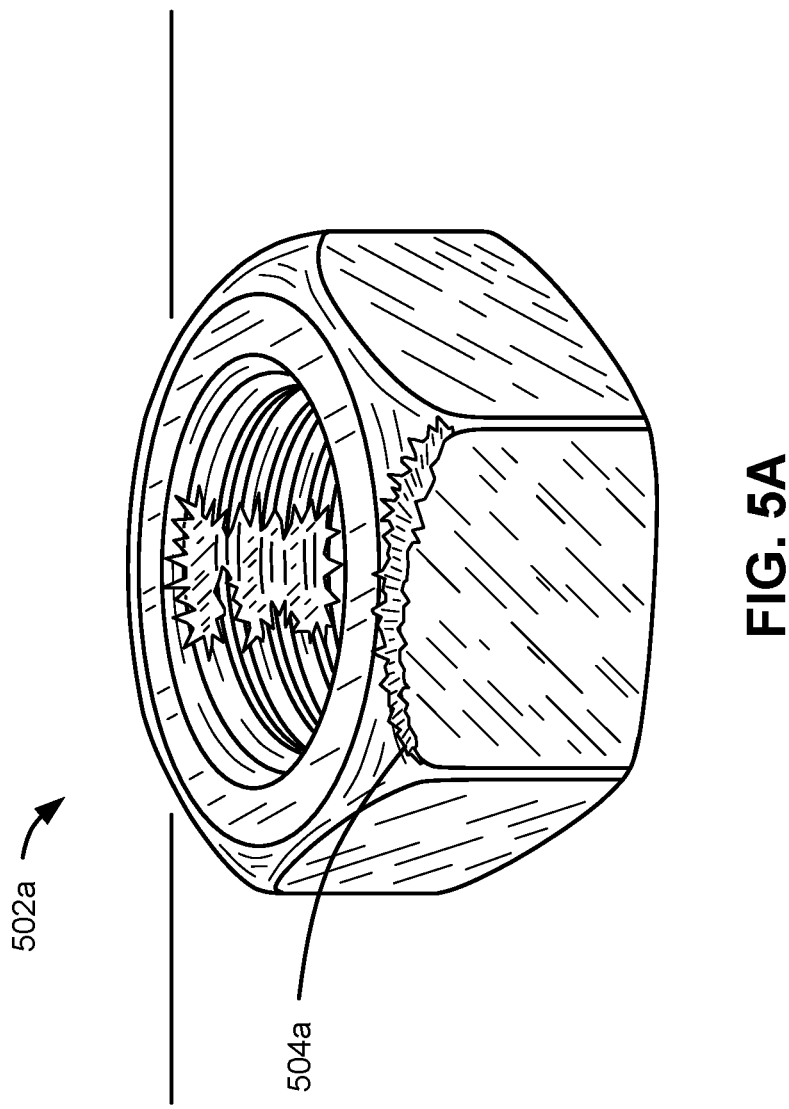
FIGS. 5A-5C illustrate schematic examples of images of a surface of an object used to generate a textured 3D representation of the object, in accordance with some embodiments.
Figure 5B:
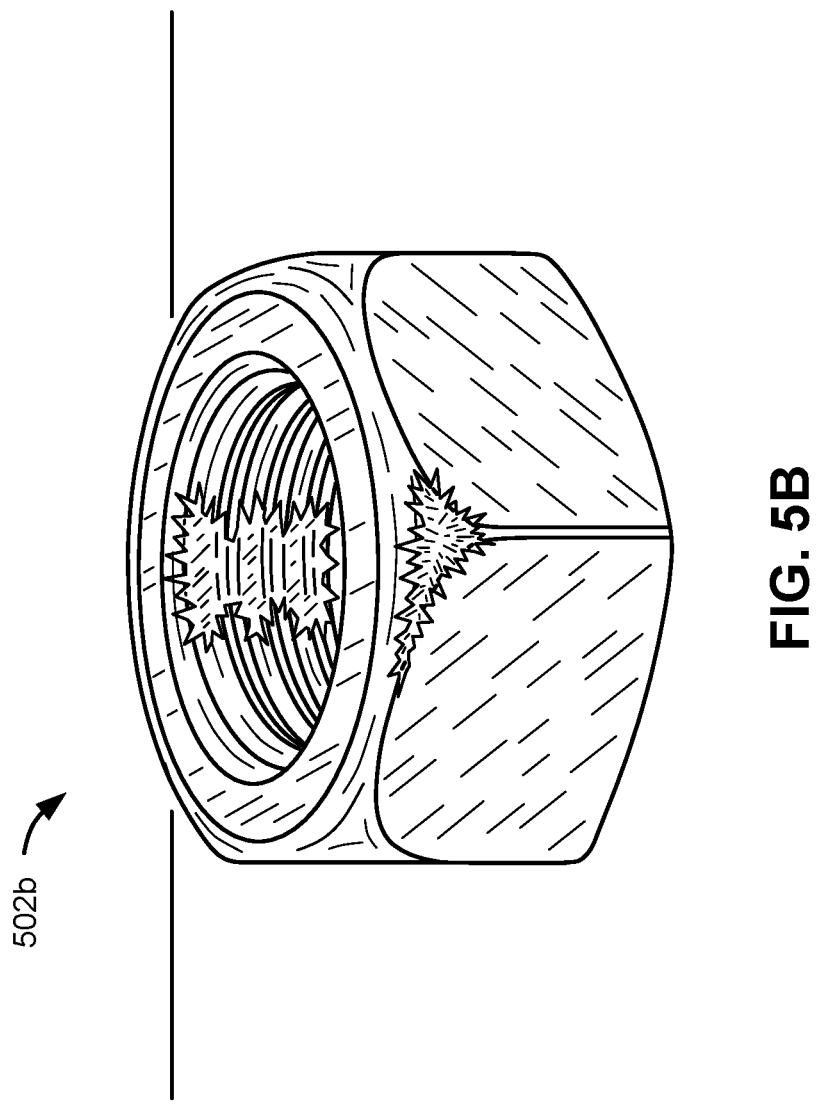
Figure 5C:
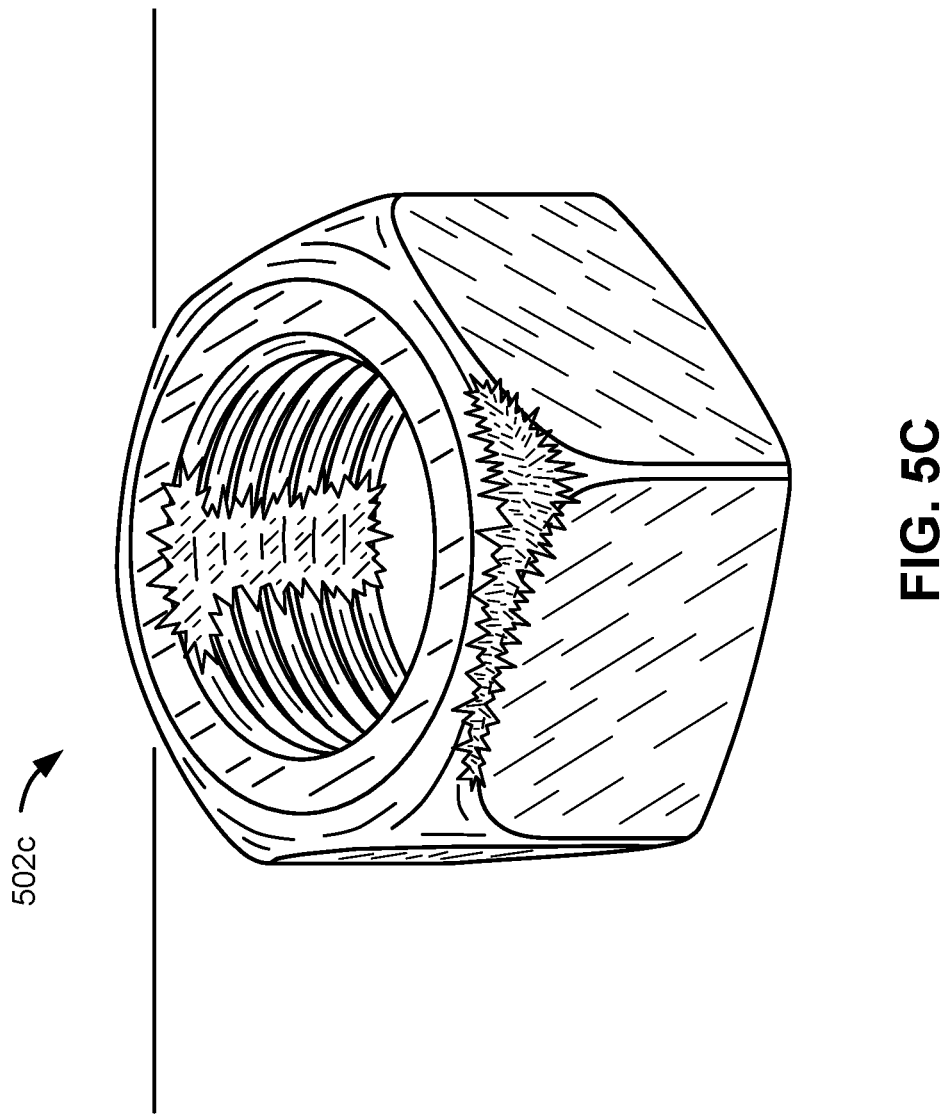
Figure 5D:
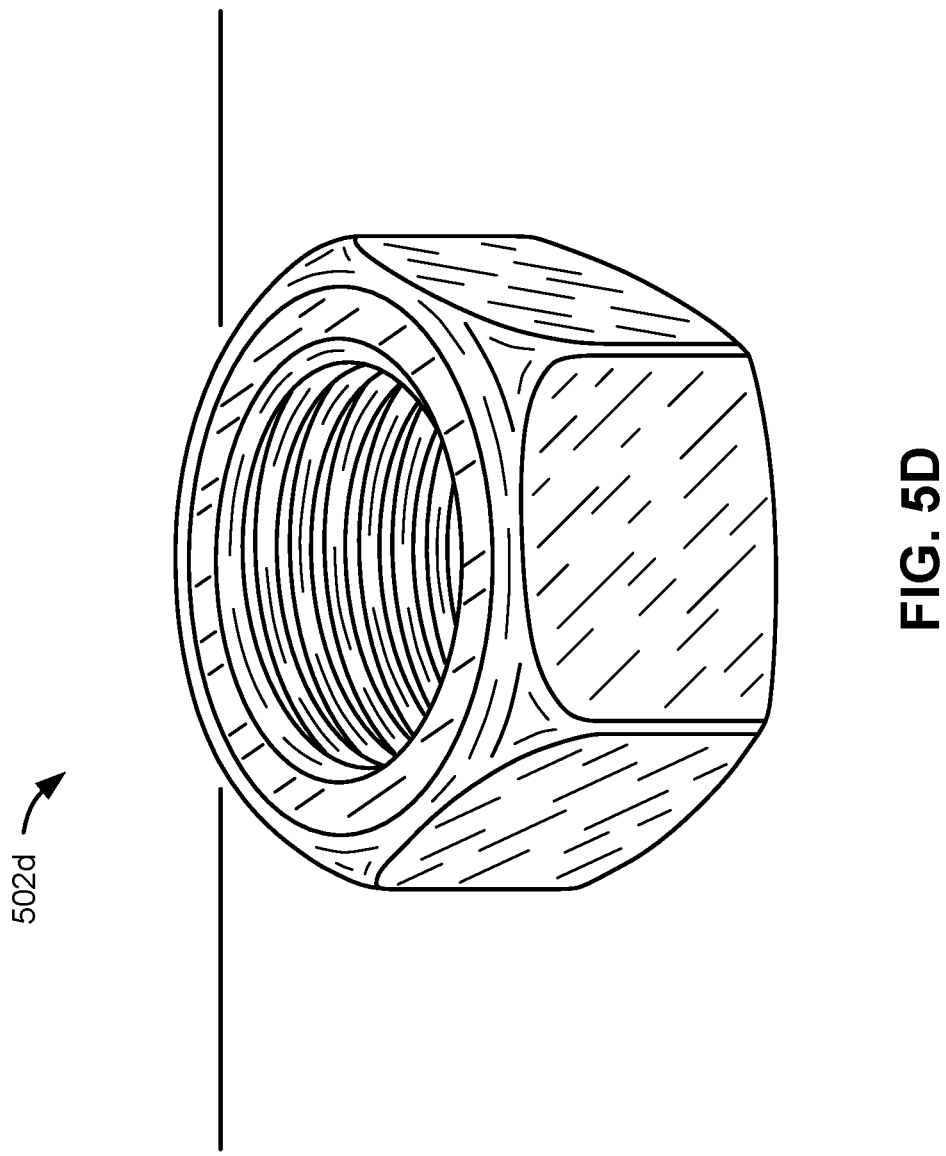
FIG. 5D illustrates a schematic example of a textured 3D representation of the object shown in FIGS. 5A-5C, generated in accordance with some embodiments.

FIGS. 5A-5C illustrate schematic examples (i.e., illustrations) of images of a surface of an object used to generate a textured 3D representation of the object, in accordance with some embodiments. For example, FIG. 5A illustrates an image 502*a* of a nut taken from a first orientation. In image 502*a*, a stray highlight 504*a* (e.g., a mirror-like reflection from a light source present when the image 502*a* was acquired) is observable on the nut. The stray highlight 504*a* is a specular (e.g., mirror-like) reflection from a light source that was present when the image 502*a* was acquired. FIG. 5B illustrates a second image 502*b* taken from a second orientation, different from the first orientation, and FIG. 5C illustrates a third image 502*c* taken from a third orientation, different from the first and second orientations. FIG. 5D illustrates an example of a textured 3D representation 506 of the object (i.e., nut) shown in FIGS. 5A-5C, generated in accordance with some embodiments of the instant invention. The textured 3D representation 506 of the object does not include a stray highlight (e.g., does not include one or more stray highlights that were present in the images of the surface of the object). Further, the textured 3D representation 506 provides a model that more accurately represents the texture (color) of both the object and table compared to the images (raw data) of FIGS. 5A-5C such that the texture of both the object and the table can be more accurately displayed under a variety of lighting conditions.

Figure 6:
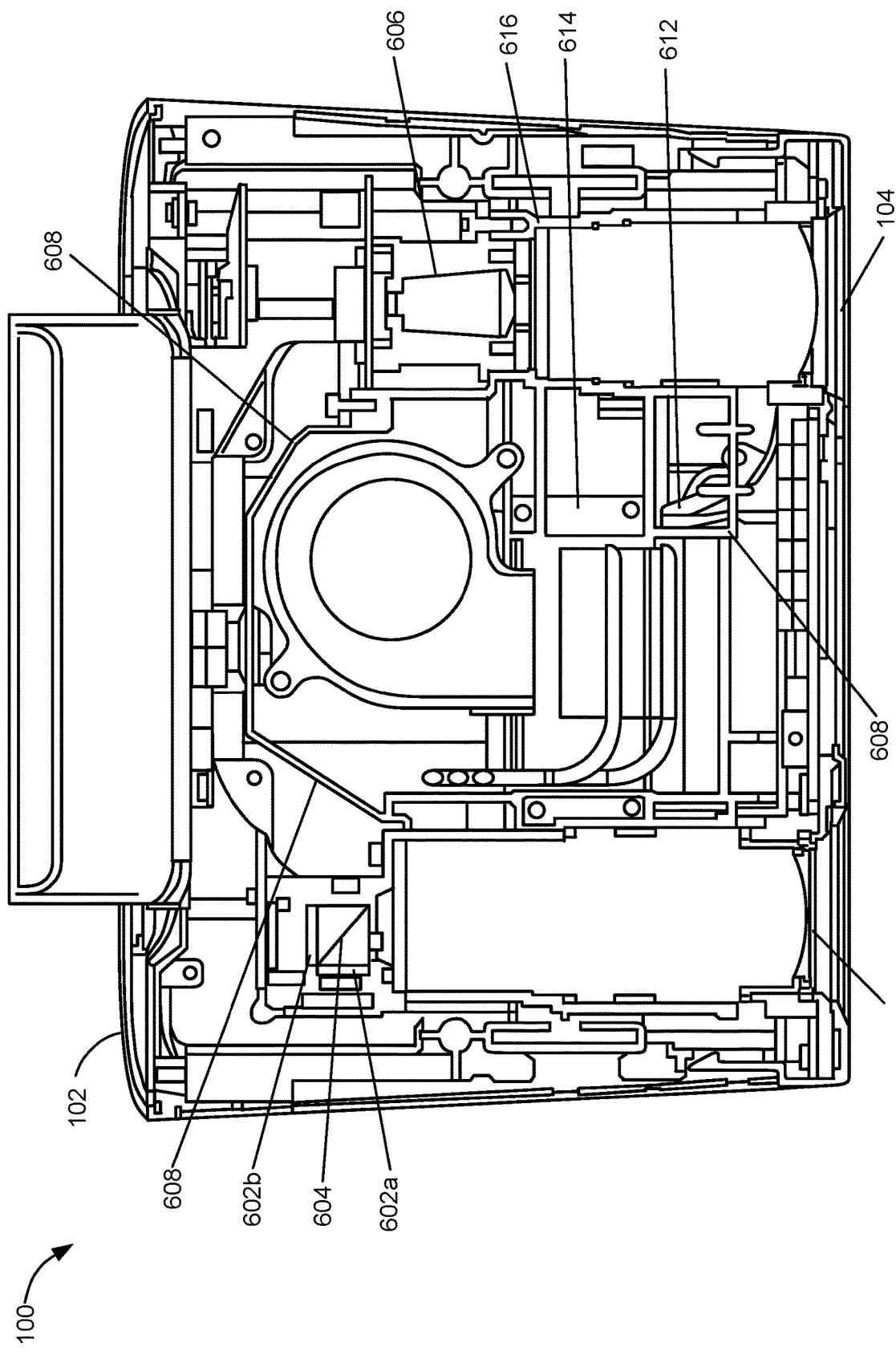
FIG. 6 is a mechanical drawing of a 3D scanner, in accordance with some embodiments.

FIG. 6 is a drawing illustrating various components of 3D scanner 100, in accordance with some embodiments. In particular, FIG. 6 illustrates a cross section of the main body housing 102 (FIG. 1). As shown in FIG. 6, the scanner 100 includes (among other components):

A first optical sensor 602*a* (e.g., a first charge-coupled device (CCD) detector) that collects 3D data of an object being scanned (e.g., collects images of structured light shone on and distorted by the surface of the object, from which a reconstruction of the 3D shape of the object can be determined). In some embodiments, the first optical sensor 602*a* is sensitive to infrared (IR) light (although the first optical sensor 602*a* may also be sensitive to visible light);

A second optical sensor 602*b* (e.g., a second CCD detector) that collects texture (e.g., color) data from an object being scanned (e.g., collects images while the structured light is not shown on the surface of the object, e.g., collects images in between stroboscopic pulses of structured light shone on the object). In some embodiments, the second optical sensor 602*b* is sensitive to visible light (although the second optical sensor 602*b* may also be sensitive to IR light);

A beam splitter 604 that separates visible light and IR light. The beam splitter 604 preferentially directs the IR light received through camera optics 106 to the first optical sensor 602*a* and preferentially directs the visible light received through camera optics 106 to the second optical sensor 602*b*;

A light source 606. In some embodiments, the light source 606 is a pulsed light source (e.g., a stroboscopic light source). In some embodiments, the light source 606 is an infrared light source. In some embodiments, the light source 606 is a laser. In some embodiments, the light source 606 is a vertical-cavity surface-emitting laser. In some embodiments, light source 606 is configured to operate (e.g., through suitable choice of pulse width, peak power, repetition rate, and/or duty cycle) as a class-1 laser everywhere outside of main body housing 102;

A slide 616 that has formed (e.g., printed or etched) thereon the spatial pattern through which light is projected onto the surface of the object (e.g., the spatial pattern is formed as opaque and transparent of the slide). Thus, light produced by light source 606 is passed through the slide 616 and projected through the source optics 104 as structured light toward (e.g., onto) the surface of the object; and A cooling manifold 608 (labelled in several places in the drawing) comprising a single piece of metal thermally coupled with light source 606, optical sensors 602 and a plurality of processors, including a GPU positioned at position 614 and an FPGA positioned at position 612.

Because of the way in which 3D data is obtained (e.g., stroboscopically producing light from a fairly powerful light source, as well as collecting and processing many images each second), heat production and removal is one of the biggest challenges in designing a handheld 3D scanner capable of previewing 3D reconstructions of objects in real-time. While maintaining a relatively cool temperature is important, maintaining a consistent temperature (both spatially and temporally) is at least equally important. The cooling manifold 608 maintains various components of the 3D scanner 100 at a consistent and stable temperature by providing thermal connectivity between the primary heat-generating components of the 3D scanner. Thus, cooling manifold 608 reduces the "warm-up" time needed for the 3D scanner to reach a stable temperature, allows for greater processing power, and increases the amount of time the 3D scanner can collect data.

FIGS. 7A-7D illustrate a flow diagram of a method 700 of generating a texture model for an object, in accordance with some embodiments. In some embodiments, method 700 is performed at a scanner (e.g., a single moveable scanner) (e.g., 3D scanner 100, FIGS. 1A-1B, or a photogrammetry scanner). The moveable scanner includes one or more optical sensors. In some embodiments, the moveable scanner includes a display. In some embodiments, the moveable scanner is a 3D scanner that includes processors for generating a 3D reconstruction of at least a portion of the shape of a surface of an object. In some embodiments, the moveable scanner is a portable handheld scanner (e.g., has a size less than 30 cm×30 cm×30 cm, such that the entire device would fit inside a box that is 30 cm×30 cm×30 cm). In some embodiments, the moveable scanner is not a 3D scanner (e.g., the moveable scanner is a photogrammetry scanner that does not generate a 3D reconstruction of the shape of an object, but rather generates a texture map for an existing un-textured 3D model of an object). In some embodiments, the scanner is a photogrammetry scanner that generates a 3D reconstruction of the surface of the object. For ease of explanation, method 700 is described as being performed by 3D scanner 100. However, method 700 can be carried out using any moveable scanner built in accordance with the instant disclosure. In some embodiments, one or more of the operations of method 700 is/are performed at a computer system separate from the moveable scanner (e.g., system 310, FIG. 3, which performs post-acquisition processing to generate the texture model). Conversely, in other embodiments, 3D scanner 100 performs methods other than method 700 in accordance with the teachings of the instant disclosure. Some operations in method 700 are, optionally, combined and/or the order of some operations is, optionally, changed.

Method 700 may be used to separate inconsistent illumination and shading from the true surface color of an object scanned using a moveable scanner. In addition, method 700 may be used to determine material properties (reflectivity, specular color, metalness, surface roughness) for each pixel of a texture map for the object. To that end, in some embodiments, method 700 uses corresponding pixels from different images of an object's surface (e.g., captured at different orientations of the scanner with respect to the object) together with tracking data that provides knowledge of the orientations at which the different values were captured to generate a single pixel of a texture map (referred to below as a pixel map). The color values from the corresponding data pixels are related to material properties using equations that describe the behavior of light incident at various angles on a surface of an object (e.g., a Lambertian diffuse model or a more complex texture model, also referred to as a lighting or shading model). In some embodiments, method 700 yields a single, corrected RGB value for each pixel point, thus removing stray highlights (i.e., specular reflections from light sources present when the color data was acquired, that should not necessarily be present when rendering a textured 3D reconstruction in different lighting). Method 700 further yields at least one per-pixel value for a non-color material property, such as a maximum specular value and the angle at which this value occurs (e.g., the "true normal").

Figure 7A:
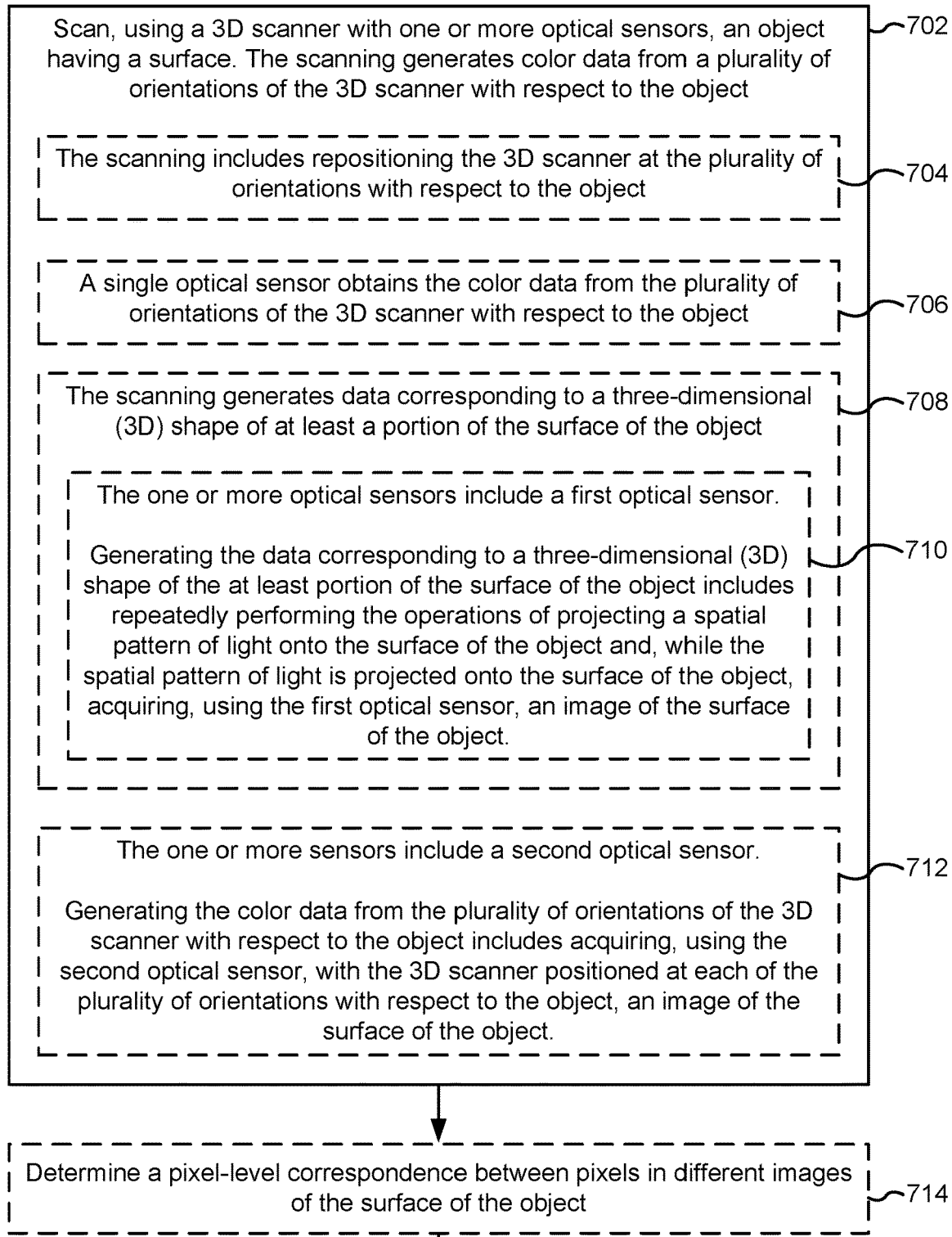

Referring to FIG. 7A, the 3D scanner 100 scans (702) an object having a surface. The scanning generates color data from a plurality of orientations of the 3D scanner 100 with respect to the object. In some embodiments, a 3D data processing computer system 310, separate from the 3D scanner 100 receives color data, generated by a 3D scanner 100 from a plurality of orientations of the 3D scanner 100 with respect to the object (e.g., as described with reference to FIG. 3). In some embodiments, the 3D scanner 100 does not have a priori knowledge of the orientations of the 3D scanner 100 with respect to the object (e.g., the orientations are not predefined or calibrated with precision).

In some embodiments, the scanning includes (704) repositioning the 3D scanner 100 at the plurality of orientations with respect to the object. For example, as shown in FIG. 3, 3D scanner 100 is repositioned from position 304a to position 304b to position 304c. The 3D scanner 100 acquires an image of object 302 at each of those positions.

In some embodiments, a single optical sensor obtains (706) the color data from the plurality of orientations of the 3D scanner 100 with respect to the object (e.g., the single optical sensor is repositioned during the scanning process). As noted below, in some such embodiments, the 3D scanner 100 includes additional optical sensors that obtain data other than the color data.

In some embodiments, the scanning generates (708) data corresponding to a three-dimensional (3D) shape of at least a portion of the surface of the object (e.g., data from which the 3D shape of the at least portion of the surface of the object can be reconstructed).

In some embodiments, the one or more optical sensors include (710) a first optical sensor (e.g., a first, infrared, CCD) (e.g., CCD detector 602a, FIG. 6). In some embodiments, the first optical sensor is for generating the data corresponding to the 3D shape of the at least portion of the surface of the object. Generating the data corresponding to a three-dimensional (3D) shape of the at least portion of the surface of the object includes repeatedly performing the operations of projecting a spatial pattern of light onto the surface of the object and, while the spatial pattern of light is projected onto the surface of the object, acquiring, using the first optical sensor, an image of the surface of the object.

In some embodiments, the one or more optical sensors include (712) a second optical sensor (e.g., a second, optical, camera) (e.g., CCD detector 602b, FIG. 6). In some embodiments, the second optical sensor is for generating the color data (e.g., the second optical sensor is the single optical sensor described in operation 706). Generating the color data from the plurality of orientations of the 3D scanner 100 with respect to the object includes acquiring, using the second optical sensor, with the 3D scanner 100 positioned at each of the plurality of orientations with respect to the object, an image of the surface of the object. Note that, in such embodiments, a plurality of pixels from the color data is used to generate values for a single pixel of the pixel map (e.g., where the plurality of pixels comprises corresponding pixels from different images). To avoid confusion, pixels of the images of the surface of the object are sometimes referred to herein as "data pixels."

In some embodiments, the images provide RGB values for the data pixels. In some embodiments, the images obtained by the second optical sensor are different from the images obtained by the first optical sensor that are used to generate the data corresponding to the three-dimensional (3D) shape of the at least portion of the surface of the object. In some embodiments, the images used to generate the color data are obtained while the spatial pattern of light is not projected onto the surface of the object (e.g., in between projections of the spatial pattern of light onto the surface of the object). In some embodiments, the images used to generate the color data are obtained while additional light (e.g., from additional light sources 105) is projected onto the surface of the object (e.g., stroboscopically).

In some embodiments, the 3D scanner 100 determines (714) a pixel-level correspondence between data pixels in different images of the surface of the object (e.g., registers the color images obtained by the second optical sensor). In some embodiments, determining a pixel-level correspondence between pixels in different images of the surface of the object includes determining that a first pixel in a first image corresponds to the same position on the surface of the object as a second pixel in a second image (different from the first image).

Figure 7B:
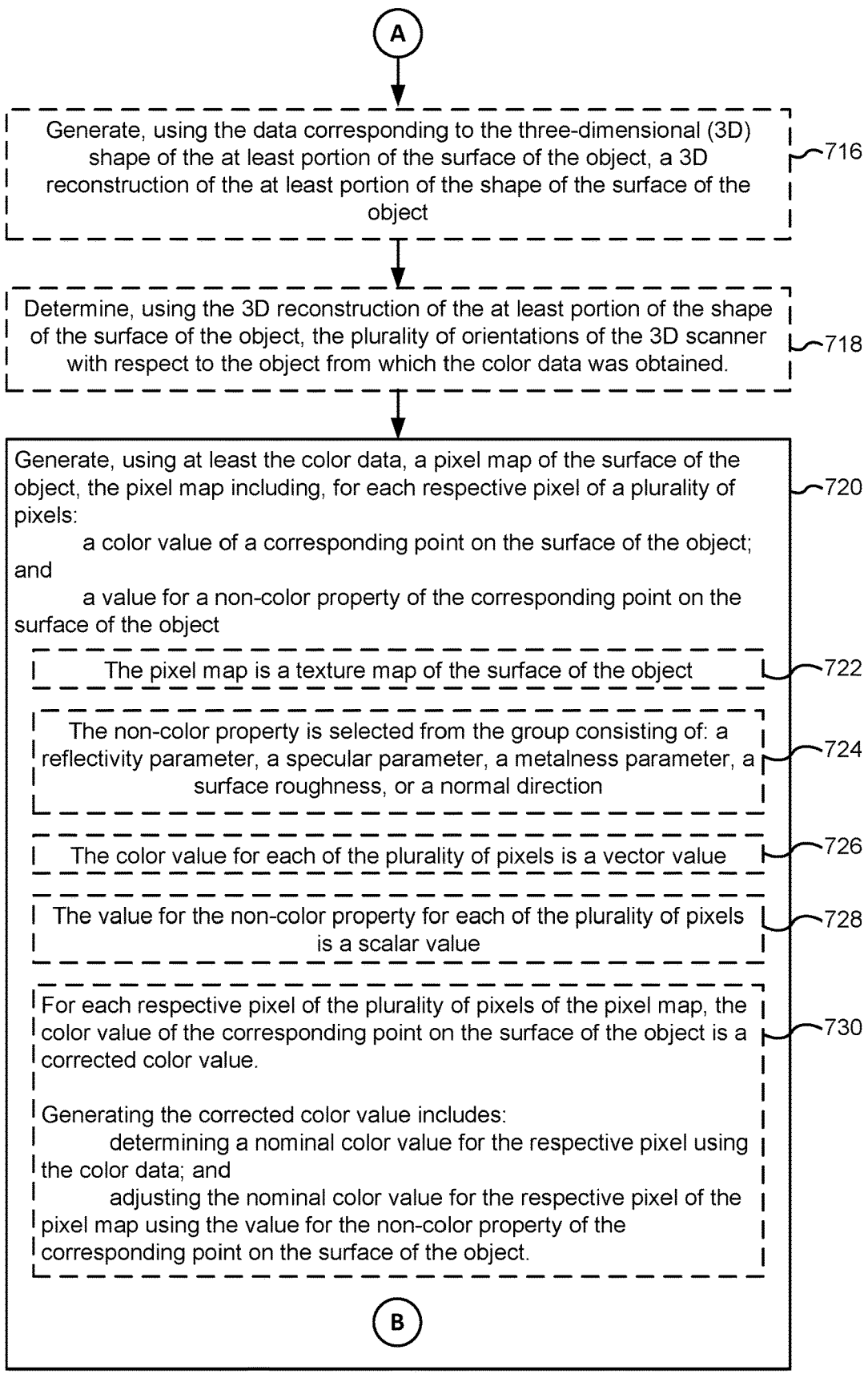

In reference to FIG. 7B, in some embodiments, the 3D scanner 100 generates (716), using the data corresponding to the three-dimensional (3D) shape of the at least portion of the surface of the object, a 3D reconstruction of the at least portion of the shape of the surface of the object. In some embodiments, the pixel-level correspondence is determined using the data corresponding to the three-dimensional (3D) shape of the at least portion of the surface of the object (e.g., the data corresponding to the three-dimensional (3D) shape of the at least portion of the surface of the object is used to generate a 3D reconstruction, which is used to register the color images). In some embodiments, the pixel-level correspondence is determined using image registration (e.g., feature detection and matching, or by defining correspondences between the images). In some embodiments, the pixel-level correspondence is determined using photogrammetry (e.g., by using image analysis to determine that two pixels in different images correspond to the same position on the surface of the object). In some circumstances, camera positions as well as a 3D shape of the surface are known and the pixel-level correspondence is calculated using projective geometry.

In some embodiments, the 3D reconstruction is a polygonal representation of the object (e.g., a polygonal mesh comprising a plurality of polygons where each polygon of the plurality of polygons represents an area of the surface of the object). Each polygon of the plurality of polygons thus has a nominal normal vector. Determining the pixel-level correspondence between data pixels in different images of the surface of the object includes selecting, as corresponding pixels, pixels from different images corresponding to the area represented by the same polygon (e.g., a plurality of the pixels from different images representing the same polygon are grouped together). With reference to FIG. 4, in some embodiments, the nominal normal vector is the nominal normal vector for the polygon. In some embodiments, selecting, as corresponding pixels, pixels from different images corresponding to the area represented by the same polygon includes mapping the color data onto a coordinate system of the 3D reconstruction of the object.

In some embodiments, the 3D scanner 100 determines (718), using the 3D reconstruction of the at least portion of the shape of the surface of the object, the plurality of orientations of the 3D scanner 100 with respect to the object from which the color data was obtained. In some embodiments, motion data (e.g., from a 9 DOF sensor) is also used to determine the plurality of orientations (e.g., determine angles at which pixels of the color data were obtained relative to the surface of the object). For example, information from a plurality of sources (e.g., the 3D data, the color data, and the motion data from a 9 DOF sensor, is combined to determine the orientations of the 3D scanner 100 with respect to the object for different images).

The 3D scanner 100 generates (720), using at least the color data, a pixel map of the surface of the object. The pixel map includes, for each respective pixel of a plurality of pixels: a color value of a corresponding point on the surface of the object; and a value for a non-color property of the corresponding point on the surface of the object. In some embodiments, the pixel map includes, for each respective pixel of a plurality of pixels, values for a plurality of non-color properties of the corresponding point on the surface of the object. In some embodiments, the pixel map is (722) a texture map of the surface of the object (e.g., comprising a set a values for parameters that are used together in order to photo-realistically represent a 3D model). In some embodiments, the color value is a diffuse value for the pixel. In some embodiments, the diffuse value (e.g., an RGB value) represents the material's tendency to scatter light in all directions (e.g., equally in all directions). Note that the pixels of the pixel map, unlike the data pixels (i.e., the pixels of the images), represent an area of the surface of the object. Thus, in some circumstances, the pixels of the pixel map are referred to as surfels (i.e., surface elements), and the pixel map is referred to as a surfel map.

In some embodiments, the non-color property is a texture property (e.g., a property that affects the appearance of the corresponding point on the surface of the object). In some embodiments, the non-color property (or properties) is selected from (724) the group consisting of: a reflectivity parameter, a specular parameter, a metalness parameter, a surface roughness, or a normal direction. In some embodiments, the specular parameter represents the tendency representing the material's tendency to scatter light like a mirror (e.g., with the angle of incidence equal to the angle of reflection).

In some embodiments, the color value for each of the plurality of pixels of the pixel map is (726) a vector value (e.g., an RGB value).

In some embodiments, the value for the non-color property for each of the plurality of pixels of the pixel map is (728) a scalar value (e.g., a single value between 0 and 1).

In some embodiments, for each respective pixel of the plurality of pixels of the pixel map, the color value of the corresponding point on the surface of the object is (730) a corrected color value (e.g., a "true diffuse" value). Generating the corrected color value includes: determining a nominal color value for the respective pixel using the color data (e.g., using the corresponding pixels from the different images of the surface of the object); and adjusting the nominal color value for the respective pixel of the pixel map using the value for the non-color property of the corresponding point on the surface of the object (e.g., 3D scanner 100 uses the color data to determine a "true normal" direction, and uses the "true normal" direction to determine a "true diffuse" value).

In some embodiments, the adjusting of the nominal color value for pixels of the pixel maps is used to remove stray highlights (e.g., by lessening the intensity of pixels that appear overly bright because of reflections from a flash and/or other lighting). In conventional systems, such stray highlights are removed manually (e.g., by an artist). Thus, some embodiments of the present disclosure obviate the need for manual removal of hotspots from texture data.

In reference to FIG. 7C, in some embodiments, the non-color property is (732) a normal direction. For each respective pixel of the plurality of pixels of the pixel map, the color value is determined using color data from a predefined range of angles relative to the normal direction for the respective pixel.

In some embodiments, the predefined range of angles is (734) a range of angles greater than a diffuse threshold angle. For each respective pixel of the plurality of pixels of the pixel map, a specular parameter is determined using color data obtained at angles relative to the normal direction that are less than the diffuse angle threshold.

In some embodiments, for each respective pixel of the plurality of pixels of the pixel map, the normal direction is determined (736) by selecting, as the normal direction, the angle at which a maximum luminance occurs in the color data.

For example, in some embodiments, method 700 includes determining, for each respective pixel of the plurality of pixels of the pixel map, which of the corresponding data pixel has the highest luminance. The angle at which the corresponding data pixel with the highest luminance was obtained is determined to be the normal direction (e.g., the "true normal"). Data pixels obtained at angles greater than, for example, 55° of this "true normal" are used to determine an adjusted color value for the respective pixel via Lambert's diffuse reflectance model for diffuse luminance:

$$L_d = \frac{\rho}{\pi}\cos(\theta_i) \times E_0 \qquad (1)$$

where $L_d$ is the luminance at an observed angle $\theta_i$ relative to the normal direction, $E_0$ is the energy of the light incident on the surface, and $\rho$ is the diffuse color of the surface (also sometimes referred to as the diffuse albedo of the pixel or surfel).

In some embodiments, a specular parameter (e.g., the gloss or, conversely, roughness) is determined for the respective pixel by subtracting the maximum value of the fitted Lambert's diffuse reflectance model (e.g., $\theta_i=0$ value) from the luminance of the data pixel that has the highest luminance, according to the following micro-facet theory rendering equation:

$$L_o = L_d + L_s \qquad (2)$$

where $L_s$ is the specular luminance and $L_o$ is the luminance at normal incidence.

In some embodiments, for each respective pixel of the plurality of pixels of the pixel map, the normal direction is determined (738) by fitting the color data (e.g., the perceived luminance) to a predetermined function of the angle at which the color data was obtained and selecting, as the normal direction, the angle at which the fitted predetermined function has a maximum luminance. Data pixels obtained at angles greater than, for example, 55° of this "true normal" are used to determine an adjusted color value for the respective pixel via Lambert's reflectance model for diffuse luminance, as described above. A specular parameter (e.g., the gloss or, conversely, roughness) is determined for the respective pixel by subtracting the maximum value of the fitted Lambert's reflectance model (e.g., $\theta_i=0$ value) from the highest value of the fitted perceived luminance, according to Equation (2).

More generally, in some embodiments, method 700 includes, for each respective pixel of the plurality of pixels of the pixel map, using a first subset of the color data corresponding to the pixel to determine a first parameter (e.g., a specular parameter or a true normal direction) and using a second subset of the color data corresponding to the pixel, different from the first subset of the color data, to determine a second parameter (e.g., a diffuse parameter). In some embodiments, as described above, the separation into two subsets of color data (data for calculation of the diffuse color and data for specular color calculation) may be based on the angle at which the data were obtained. In some embodiments, the separation into two subsets of color data may be done based on other principles like absolute color or any variation of those.

In reference to FIG. 7D, in some embodiments, for each pixel of the plurality of pixels of the pixel map, the value for the non-color property of the corresponding point on the surface of the object is determined (740) by: providing, to a solver for a set of one or more texture equations (e.g., lighting and/or shading equations) (e.g., a texture model, which may including shading equations and/or a reflectance model), the images of the surface of the object together with information indicating the orientations of the 3D scanner 100 with respect to the object at which the images were obtained; and receiving, as an output from the solver for the set of one or more texture equations, the value for the non-color property of the corresponding point on the surface of the object.

Note that, in some embodiments, the texture model includes a set of equations that are conventionally used for physically-based rendering. Thus, in some embodiments, operation 740 amounts to running a physically-based rendering (PBR) model "in reverse." Normally, such PBR models are used by computer animators (e.g., for video games or movies), who input material properties that they have chosen and receive, as outputs, perceived colors that depend on the lighting selected by the animator. Operation 740 uses, as inputs, perceived colors at various angles and determines the material properties.

In some embodiments, the texture model is a bidirectional reflectance distribution function (BRDF) model. For example, the Lambertian diffuse reflectance model can be written:

$$f(l, v) = \frac{\rho}{\pi} \qquad (3)$$

where l is a unit vector in a direction of a light source, v is a unit vector in a direction of the viewer. In some embodiments (e.g., in which the 3D scanner uses a structured light approach) the dominant light incident upon object in the color images is the light emitted by the scanner itself (e.g., from the spatially patterned light, or from the additional light sources, as described above). Thus, in some embodiments, the direction of the light source l is assumed to be the direction from the 3D scanner to the object. This assumption greatly simplifies the computation difficulty of generating the color model (e.g., the pixel map generated in operation 720).

In some embodiments, the texture model is a micro-facet specular BRDF model, such as the Cook-Torrance micro-facet specular shading model or other micro-facet model. The Cook-Torrance micro-facet specular shading model assumes that the surface consists of micro-facets, each of which reflects specularly. The Cook-Torrance micro-facet specular shading model can be written:

$$f(l, v) = \frac{D(h)F(v, h)G(l, v, h)}{4(n \cdot l)(n \cdot v)} \qquad (4)$$

where h is a unit angular bisector of v and l, n is a unit normal vector (e.g., a unit vector in the direction of the "true normal"). The functions D, F, and, G are defined below. In some circumstances, the Cook-Terrance model is used to determine a value of a specular parameter (e.g., specular shading) and a Lambertian reflectance model is used to determine a diffuse value.

Only facets whose normal is in the direction h contribute to the specular component of reflection from l to v. Thus, the function D(h) is a facet slope distribution function that represents the fraction of facets that are oriented in the direction h. The function D can be written:

$$D(h) = \frac{\alpha^2}{\pi((n \cdot h)^2(\alpha^2 - 1) + 1)} \quad (5)$$

where α is the square of the roughness.

The function G is a geometric attenuation factor that accounts for shadowing and masking of one facet by another, and can be written:

$$G_1(v) = \frac{(n \cdot v)}{(n \cdot v)(1 - k) + k} \quad (6)$$

$$G(l, v, h) = G_1(v) \times G_1(l) \quad (7)$$

where k is a parameter specific to the model. For example, in some embodiments, k relates to the material's roughness.

The function F is a Fresnel term that describes how light is reflected from each smooth micro-facet, and can be written:

$$F(v,h) = F_0 + (1 - F_0) \times 2^{(-5.55473(v \cdot h) - 6.98316)(v \cdot h)} \quad (8)$$

where $F_0$ is the specular reflectance at normal incidence.

Note that BRDF models and formulas described above, including the Cook-Torrance micro-facet specular shading model, are just examples of texture models. One of skill in the art will recognize, given the benefit of this disclosure, that any number of texture models may be used in accordance with various embodiments of the present disclosure. Other texture models include, but are not limited to, the Phong reflection model, a Gaussian distribution model, a Beckmann distribution model, a Heidrich-Seidel anisotropic model, and/or a Ward anisotropic model.

Thus, some embodiments of the present disclosure assume that the texture of a surface on an object can be decomposed (e.g., additively) into a plurality of texture properties of a material (e.g., specular and diffuse luminance), and that those texture properties can be related to color observations through a texture model. The claims that follow, however, should not be construed as limited to a particular texture model unless expressly stated.

In addition, as can be seen from the equations above, some texture models relate the location of one or more light sources to an observed color. In some embodiments, the 3D scanner includes a light source. In some embodiments, the light source on the 3D scanner is substantially brighter than any light sources external to the 3D scanner. Thus, in some embodiments, the location of the light source is known and the method includes using the known location of the light source in the texturing equations. For example, the method includes assuming that specular reflections are due only to the light source on the 3D scanner, and solving the texture equations without regard to any light sources external to the 3D scanner (e.g., solving the texture equations includes assuming that ambient illumination is negligible compared to the light emitted by the light source on the 3D scanner).

In some embodiments, the 3D scanner 100 generates (742), using the 3D reconstruction of the at least portion of the shape of the surface of the object and pixel map, a textured 3D representation of the object.

In some embodiments, the 3D scanner 100 uses (744) the textured 3D representation of the object to animate a corresponding object in an animation (e.g., by mapping the color map onto a polygonal grid of the 3D reconstruction of the object).

In some embodiments, the non-color property is a normal direction and the normal directions in the pixel map are used for metrology, inspection, and/or quality assurance purposes (e.g., surface inspection, scratch and crack detection, etc.) In some embodiments, the 3D scanner 100 detects one or more cracks (or scratches) and displays (e.g., on an integrated display or a display separate from the 3D scanner 100) the 3D representation of the object with visual indicia showing the location of the cracks (or scratches). In some embodiments, in accordance with a determination that the object is scratched (or cracked) beyond a predefined threshold (e.g., a quality-assurance threshold), the 3D scanner 100 generates a report indicating that the object is scratched (or cracked) beyond the predefined threshold.

In some embodiments, the 3D scanner 100 displays (e.g., on an integrated display or a display separate from the 3D scanner 100) the pixel map (e.g., displays the textured 3D representation of the object). In some embodiments, the 3D scanner 100 displays the color values of the pixel map without displaying the values of the non-color property of the pixel map (e.g., displays the texture 3D representation of the object with only the diffuse color). In some embodiments, the 3D scanner 100 displays the values of the non-color property of the pixel map without displaying the color values of the pixel map (e.g., displays the texture 3D representation of the object with only the diffuse color). In some embodiments, the 3D scanner 100 receives a user input and, in response to the user input, toggles between displaying the textured 3D representation of the object, displaying the color values of the pixel map, and displaying values for the non-color property (or properties) (e.g., in response to receiving the user input, the 3D scanner 100 transitions from displaying the textured 3D representation of the object to displaying the color values of the pixel map or values for the non-color property; or, in response to receiving the user input, the 3D scanner 100 transitions from displaying the color values of the pixel map to displaying the textured 3D representation of the object or displaying the values for the non-color property; or, in response to receiving the user input, the 3D scanner 100 transitions from displaying the values of the non-color property to displaying the textured 3D representation of the object or displaying the color values of the pixel map).

The foregoing description, for purpose of explanation, has been described with reference to specific embodiments and drawings. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

It will also be understood that, although the terms first, second, etc. are, in some instances, used herein to describe various elements, these elements should not be limited by these terms. These terms are only used to distinguish one element from another. For example, a first sensor could be termed a second sensor, and, similarly, a second sensor could be termed a first sensor, without departing from the scope of the various described embodiments. The first sensor and the second sensor are both sensors, but they are not the same sensor, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

What is claimed is:

1. A method, comprising:
   scanning, using a three-dimensional (3D) scanner with one or more optical sensors, an object having a surface, wherein the scanning generates:
      color data from a plurality of orientations of the 3D scanner with respect to the object; and
      data corresponding to a three-dimensional (3D) shape of at least a portion of the surface of the object;
   generating, using the data corresponding to the three-dimensional (3D) shape of the at least portion of the surface of the object, a 3D reconstruction of the shape of the at least portion of the surface of the object, wherein the 3D reconstruction comprises a plurality of pixels;
   for each pixel of the plurality of pixels, determining a true normal direction;
   generating, using at least the color data, a pixel map of the surface of the object, the pixel map including, for each respective pixel of a plurality of pixels:
      a color value of a corresponding point on the surface of the object, wherein, for each respective pixel of the plurality of pixels of the pixel map, the color value is determined using color data from a predefined range of angles relative to the true normal direction for the respective pixel and wherein the predefined range of angles is a range of angles greater than a diffuse threshold angle; and
      a value for a specular property of the corresponding point on the surface of the object, wherein the value for the specular property of the corresponding point on the surface of the object is determined using the true normal direction for the corresponding point on the surface of the object, wherein the value of the specular property is determined using color data obtained at angles relative to the true normal direction that are less than the diffuse angle threshold.

2. The method of claim 1, wherein the pixel map is a texture map of the surface of the object.

3. The method of claim 1, further including generating, using at least the color data, for each respective pixel of the plurality of pixels, a value for a non-color property of the respective pixel, wherein the non-color property is selected from the group consisting of: a metalness parameter, and a surface roughness.

4. The method of claim 1, wherein the scanning includes repositioning the 3D scanner at the plurality of orientations with respect to the object.

5. The method of claim 1, wherein a single optical sensor obtains the color data from the plurality of orientations of the 3D scanner with respect to the object.

6. The method of claim 1, further comprising:
   generating, using the 3D reconstruction of the shape of the at least portion of the surface of the object and pixel map, a textured 3D representation of the object.

7. The method of claim 6, further including:
   using the textured 3D representation of the object to animate a corresponding object in an animation.

8. The method of claim 1, further including:
   determining, using the 3D reconstruction of the shape of the at least portion of the surface of the object, the plurality of orientations of the 3D scanner with respect to the object from which the color data was obtained.

9. The method of claim 1, wherein:
   the one or more optical sensors include a first optical sensor; and
   generating the data corresponding to the three-dimensional (3D) shape of the at least portion of the surface of the object includes repeatedly performing the operations of:
      projecting a spatial pattern of light onto the surface of the object; and
      while the spatial pattern of light is projected onto the surface of the object, acquiring, using the first optical sensor, an image of the surface of the object.

10. The method of claim 1, wherein:
    the one or more optical sensors include a second optical sensor; and
    generating the color data from the plurality of orientations of the 3D scanner with respect to the object includes acquiring, using the second optical sensor, with the 3D scanner positioned at each of the plurality of orientations with respect to the object, an image of the surface of the object.

11. The method of claim 1, further including:
    determining a pixel-level correspondence between pixels in different images of the surface of the object.

12. The method of claim 1, wherein:
    for each respective pixel of the plurality of pixels of the pixel map, the color value of the corresponding point on the surface of the object is a corrected color value; and
    generating the corrected color value includes:
       determining a nominal color value for the respective pixel using the color data; and
       adjusting the nominal color value for the respective pixel of the pixel map using the value for the specular property of the corresponding point on the surface of the object.

13. The method of claim 1, wherein, for each respective pixel of the plurality of pixels of the pixel map, the true normal direction is determined by selecting, as the true normal direction, the angle at which a maximum luminance occurs in the color data.

14. The method of claim 1, wherein, for each respective pixel of the plurality of pixels of the pixel map, the true normal direction is determined by:
    fitting the color data to a predetermined function of the angle at which the color data was obtained; and selecting, as the true normal direction, the angle at which the fitted predetermined function has a maximum luminance.

15. The method of claim 1, wherein the color value for each of the plurality of pixels is a vector value.

16. The method of claim 1, wherein the value for the specular property for each of the plurality of pixels is a scalar value.

17. The method of claim 1, wherein the 3D scanner is a portable handheld 3D scanner.

18. A method, comprising:
scanning, using a three-dimensional (3D) scanner with one or more cameras, an object having a surface, wherein the scanning generates:
color data from a plurality of orientations of the 3D scanner with respect to the object, wherein generating the color data from the plurality of orientations of the 3D scanner with respect to the object includes acquiring, with the one or more cameras positioned at each of the plurality of orientations with respect to the object, an image of the surface of the object; and
data corresponding to a three-dimensional (3D) shape of at least a portion of the surface of the object, wherein generating the data corresponding to the three-dimensional (3D) shape of the at least portion of the surface of the object includes repeatedly performing the operations of:
projecting a spatial pattern of light onto the surface of the object; and
while the spatial pattern of light is projected onto the surface of the object, acquiring, using the one or more cameras, an image of the surface of the object;
generating, using the data corresponding to the three-dimensional (3D) shape of the at least portion of the surface of the object, a 3D reconstruction of the shape of the at least portion of the surface of the object;
generating a pixel map of the surface of the object, the pixel map including, for each respective pixel of a plurality of pixels:
a value for a non-color property of a corresponding point on the surface of the object;
a color value of the corresponding point on the surface of the object, wherein the color value is generated using the color data and corrected according to the value of the non-color property of the corresponding point on the surface of the object;
wherein:
for each pixel of the plurality of pixels of the pixel map, the value for the non-color property of the corresponding point on the surface of the object is determined by:
providing, to a solver for a set of one or more texture equations, the images of the surface of the object together with information indicating the orientations of the 3D scanner with respect to the object at which the images were obtained; and
receiving, as an output from the solver for the set of one or more texture equations, the value for the non-color property of the corresponding point on the surface of the object.

19. The method of claim 18, wherein the pixel map is a texture map of the surface of the object.

20. The method of claim 18, wherein the non-color property is selected from the group consisting of: a diffuse value, a specular value, a metalness parameter, and a surface roughness.

21. The method of claim 18, wherein the scanning includes repositioning the 3D scanner at the plurality of orientations with respect to the object.

22. The method of claim 18, wherein a single optical sensor obtains the color data from the plurality of orientations of the 3D scanner with respect to the object.

23. The method of claim 18, further comprising:
generating, using the 3D reconstruction of the shape of the at least portion of the surface of the object and pixel map, a textured 3D representation of the object.

24. The method of claim 23, further including:
using the textured 3D representation of the object to animate a corresponding object in an animation.

25. The method of claim 18, further including:
determining, using the 3D reconstruction of the shape of the at least portion of the surface of the object, the plurality of orientations of the 3D scanner with respect to the object from which the color data was obtained.

26. The method of claim 18, further including:
determining a pixel-level correspondence between pixels in different images of the surface of the object.

\* \* \* \* \*